(12) United States Patent
Tan et al.

(10) Patent No.: US 10,866,659 B2
(45) Date of Patent: *Dec. 15, 2020

(54) NAVIGATION DEVICE WITH LOW POWER CONSUMPTION AND OPERATING METHOD THEREOF

(71) Applicant: PixArt Imaging Inc., Hsin-Chu County (TW)

(72) Inventors: Zi-Hao Tan, Penang (MY); Kevin Len-Li Lim, Penang (MY)

(73) Assignee: PIXART IMAGING INC., Hsin-Chu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/678,723

(22) Filed: Nov. 8, 2019

(65) Prior Publication Data

US 2020/0159343 A1 May 21, 2020

Related U.S. Application Data

(63) Continuation of application No. 15/622,598, filed on Jun. 14, 2017, now Pat. No. 10,509,493.

(51) Int. Cl.
| | |
|---|---|
| *G06F 3/03* | (2006.01) |
| *G06F 3/038* | (2013.01) |
| *G06F 3/0354* | (2013.01) |
| *G06F 1/3234* | (2019.01) |

(52) U.S. Cl.
CPC .......... *G06F 3/0383* (2013.01); *G06F 1/3259* (2013.01); *G06F 3/0317* (2013.01); *G06F 3/03543* (2013.01)

(58) Field of Classification Search
CPC ............ G06F 3/03–033; G06F 3/0338; G06F 3/0354; G06F 3/03541; G06F 3/03543; G06F 3/03544; G06F 3/038; G06F 3/0383; G06F 3/039–0395; G06F 1/3259; G06F 3/0317

See application file for complete search history.

(56) References Cited

U.S. PATENT DOCUMENTS

| | | | |
|---|---|---|---|
| 6,455,840 B1 * | 9/2002 | Oliver | H04N 1/047 250/222.1 |
| 2009/0195505 A1 * | 8/2009 | Chen | G06F 3/038 345/166 |
| 2010/0013771 A1 * | 1/2010 | Cheng | G06F 3/0317 345/166 |
| 2011/0150363 A1 * | 6/2011 | Chen | G06F 3/0317 382/291 |
| 2013/0113759 A1 * | 5/2013 | Gu | G06F 3/03547 345/175 |

(Continued)

*Primary Examiner* — Roberto W Flores
(74) *Attorney, Agent, or Firm* — WPAT, PC (57) ABSTRACT

A navigation device including an image sensor, a processor and a memory is provided. The memory stores a lookup table of a plurality of frame rates each corresponding to one frame period extender. The image sensor captures a pair of image frames. The processor calculate a current displacement according to the pair of image frames, read a next frame period and a corresponding frame period extended value from the memory according to the calculated current displacement, and insert an inactive period after the pair of image frames when the frame period extended value is larger than 1 and the current displacement is larger than a displacement threshold.

20 Claims, 5 Drawing Sheets

(56) References Cited

U.S. PATENT DOCUMENTS

| | | | | |
|---|---|---|---|---|
| 2013/0229514 A1* | 9/2013 | Huang | ............... | G06F 3/0317 348/140 |
| 2013/0249800 A1* | 9/2013 | Chung | ............... | G06F 1/3259 345/166 |
| 2013/0301880 A1* | 11/2013 | Chen | ............... | G06F 3/0383 382/103 |
| 2014/0028868 A1* | 1/2014 | Huang | ............... | G01B 11/02 348/222.1 |
| 2014/0300548 A1* | 10/2014 | Lye | ............... | G06F 3/03543 345/163 |
| 2014/0306892 A1* | 10/2014 | Lin | ............... | G09G 5/22 345/159 |
| 2015/0301630 A1* | 10/2015 | Lee | ............... | G06F 3/03543 345/163 |
| 2016/0054816 A1* | 2/2016 | Lee | ............... | G06F 3/03543 345/166 |

\* cited by examiner

| Normal Frame Period/Frame Rate | Frame Period (FPX) Extended value | Average Frame Rate (fps) |
|---|---|---|
| 1/3000 or 3000 | 8 | 375 |
| 1/1500 or 1500 | 4 | 375 |
| 1/750 or 750 | 2 | 375 |
| 1/375 or 375 | 1 | 375 |
| 1/188 or 188 | 1 | 188 |
| 1/94 or 94 | 1 | 94 |

NAVIGATION DEVICE WITH LOW POWER CONSUMPTION AND OPERATING METHOD THEREOF

RELATED APPLICATIONS

The present application is a continuation application of U.S. application Ser. No. 15/622,598, filed on Jun. 14, 2017, the disclosure of which is hereby incorporated by reference herein in its entirety.

BACKGROUND

1. Field of the Disclosure

This disclosure generally relates to a navigation device and, more particularly, to a navigation device with low power consumption and an operating method thereof.

2. Description of the Related Art

Conventionally, it is able to reduce the power consumption of an optical mouse by changing an image capture frequency of an image sensor thereof. For example, when the moving speed of the optical mouse is faster, an image capture frame rate of the image sensor becomes higher; on the contrary, when the moving speed of the optical mouse is slower, the image capture frame rate becomes lower. Accordingly, the total power consumption of the optical mouse can be reduced if the moving speed of the optical mouse is relatively low for a longer time.

However, if the moving speed of the optical mouse is continuously maintained at a higher level, the power consumption of the optical mouse is relatively high as the image sensor thereof captures more images per minutes and the processor thereof calculates the moving speed more frequently.

Accordingly, the navigation device having low power consumption and using an adaptable frame rate is required.

SUMMARY

One object of the present disclosure is to provide a navigation device and an operation method thereof that insert a low power mode interval between normal mode intervals when the frame rate is higher than a predetermined frame rate such that an average frame rate is kept at a relatively lower level.

To achieve the above object, the present disclosure provides a navigation device including a memory, an image sensor and a processor. The memory is configured to store a plurality of frame periods and a plurality of frame period extended values, wherein each of the frame period extended values corresponds to one of the frame periods, at least one of the frame period extended values is equal to 1 and at least another one of the frame period extended values is larger than 1 and equal to 2n, where n is a positive integer. The image sensor is configured to capture a first pair of image frames. The processor is electrically coupled to the memory and the image sensor, and configured to calculate a current displacement according to the first pair of image frames, determine a next frame period and a corresponding frame period extended value (FPX1) according to the calculated current displacement, and insert an inactive period after the first pair of image frames, during which no image frame is captured by the image sensor, when the FPX1 is larger than 1 and the current displacement is larger than a high displacement threshold, wherein the inactive period is equal to $(2\times FPX1-1)\times$(the next frame period). A time interval from a first image frame of the first pair of image frames to an end of the inactive period is not changed even though a different frame period extended value, which is larger than 1 and equal to 2n, is determined according to the calculated current displacement.

The present disclosure further provides a navigation device including an image sensor, a register and a processor. The image sensor is configured to capture a pair of image frames. The register is configured to store a current frame period extended value (FPXc). The processor is electrically coupled to the register and the image sensor, and configured to calculate a current displacement according to the pair of image frames, read the FPXc from the register, select a next frame period and a next frame period extended value (FPXn) according to the calculated current displacement, wherein the next frame period is selected from a plurality of predetermined frame periods, the FPXn is selected from a plurality of predetermined frame period extended values, each of the predetermined frame period extended values corresponds to one of the predetermined frame periods, at least one of the predetermined frame period extended values is equal to 1, and at least another one of the predetermined frame period extended values is larger than 1 and equal to 2n, where n is a positive integer, capture a next image frame after the next frame period when the FPXn is equal to 1 or the current displacement is smaller than a low displacement threshold, and control the image sensor to capture another pair of image frames after an inactive period, during which no image frame is captured by the image sensor, when the FPXn is larger than 1 and the current displacement is not smaller than the low displacement threshold, wherein the inactive period is equal to $(2\times FPXn-1)\times$(the next frame period). A time interval from a first image frame of the pair of image frames to an end of the inactive period is not changed even though a different FPXn, which is larger than 1, is selected.

The present disclosure further provides an operating method of a navigation device. The navigation device includes an image sensor and a processor electrically coupled to each other. The operating method including the steps of: capturing, by the image sensor, a first pair of image frames; calculating, by the processor, a current displacement according to the first pair of image frames; selecting, by the processor, a next frame period and a corresponding frame period extended value (FPX1) according to the calculated current displacement, wherein the next frame period is selected from a plurality of predetermined frame periods, the FPX1 is selected from a plurality of predetermined frame period extended values, each of the predetermined frame period extended values corresponds to one of the predetermined frame periods, at least one of the predetermined frame period extended values is equal to 1, and at least another one of the predetermined frame period extended values is larger than 1 and equal to 2n, where n is a positive integer; capturing, by the image sensor, a next image frame after the next frame period when the FPX1 is equal to 1 or the current displacement is not larger than a high displacement threshold; and capturing, by the image sensor, a second pair of image frames after an inactive period, during which no image frame is captured by the image sensor, when the FPX1 is larger than 1 and the current displacement is larger than the high displacement threshold, wherein the inactive period is equal to $(2\times FPX1-1)\times$(the next frame period); wherein a time interval from a first image frame of the first pair of image frames to an end of the inactive period is not changed even though a different FPX1, which is larger than 1, is selected.

In the navigation device and an operating method of the present disclosure, when a low power mode is entered, the image sensor stops capturing image frames and the processor stops calculating the moving speed for a predetermined time interval, referred as an inactive period herein. The displacement within the inactive period is extrapolated according to the displacement calculated according to two image frames captured right after the inactive period.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
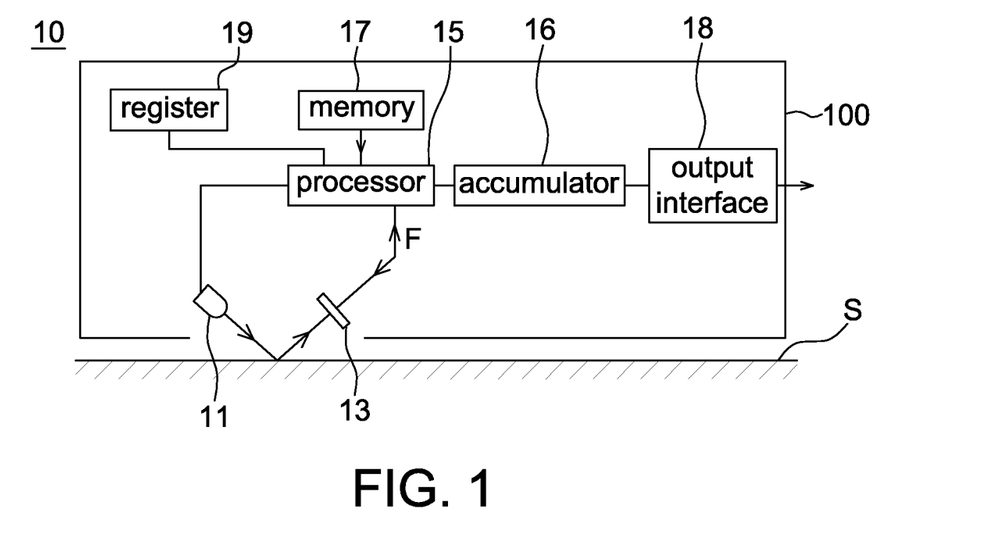
FIG. 1 is a schematic block diagram of a navigation device according to one embodiment of the present disclosure.

Referring to FIG. 1, it is a schematic block diagram of a navigation device 10 according to one embodiment of the present disclosure. The navigation device 10 of the present disclosure detects relative displacement with respect to a surface S, wherein the surface S is a table surface, a finger surface, a paper surface, a roller surface depending on different applications to which the navigation device 10 is applied. The navigation device 10 of the present disclosure is an optical mouse, an optical finger mouse or other optical displacement detection devices capable of detecting the relative displacement. During the detection, one of the navigation device 10 and the surface S is fixed and the other one is moving, or both of the navigation device 10 and the surface S are moving according to different applications.

The navigation device 10 includes a light source 11, an image sensor 13, a processor 15, an accumulator 16, a memory 17, an output interface 18 and a register 19 electrically coupled to one another, e.g., through an electric board, signal lines and/or semiconductor circuits. Although FIG. 1 shows that the accumulator 16, the memory 17 and the register 19 are arranged outside of the processor 15, it is only intended to illustrate but not to limit the present disclosure. In some embodiments, a part of or all of the accumulator 16, the memory 17 and the register 19 are arranged in the processor 15. In some embodiments, the above elements of the navigation device 10 are encapsulated as a control chip.

In some embodiments, these elements included in the navigation device 10 are arranged inside a housing 100 of the navigation device 10. The housing 100 preferably has an opening, e.g., shown on a bottom side in FIG. 1, through which the navigation device 10 detects the displacement with respect to the surface S.

The light source 11 emits light of an identifiable spectrum to illuminate the surface S. Generally, said identifiable spectrum is arranged within an invisible spectrum such that the emitted light does not affect the user during operation. For example, the light source 11 is at least one red light emitting diode (LED), at least one red laser diode, at least one infrared LED or at least one infrared laser diode, but not limited thereto.

The image sensor 13 receives light reflected from the surface S at an adjustable frame rate to output image frames F. The image sensor 13 is a CMOS image sensor, a CCD image sensor or other optical sensors for generating raw data or digitized image data according to sensed light from the surface S.

In some embodiments, the navigation device 10 further includes the light guiding element(s) for guiding the light emitted from the light source 11 and/or received by the image sensor 13. In some embodiments, the light source 11 and the image sensor 13 are arranged as the so-called bright field arrangement. In other embodiments, the light source 11 and the image sensor 13 are arranged as the so-called dark field arrangement.

Figure 2:
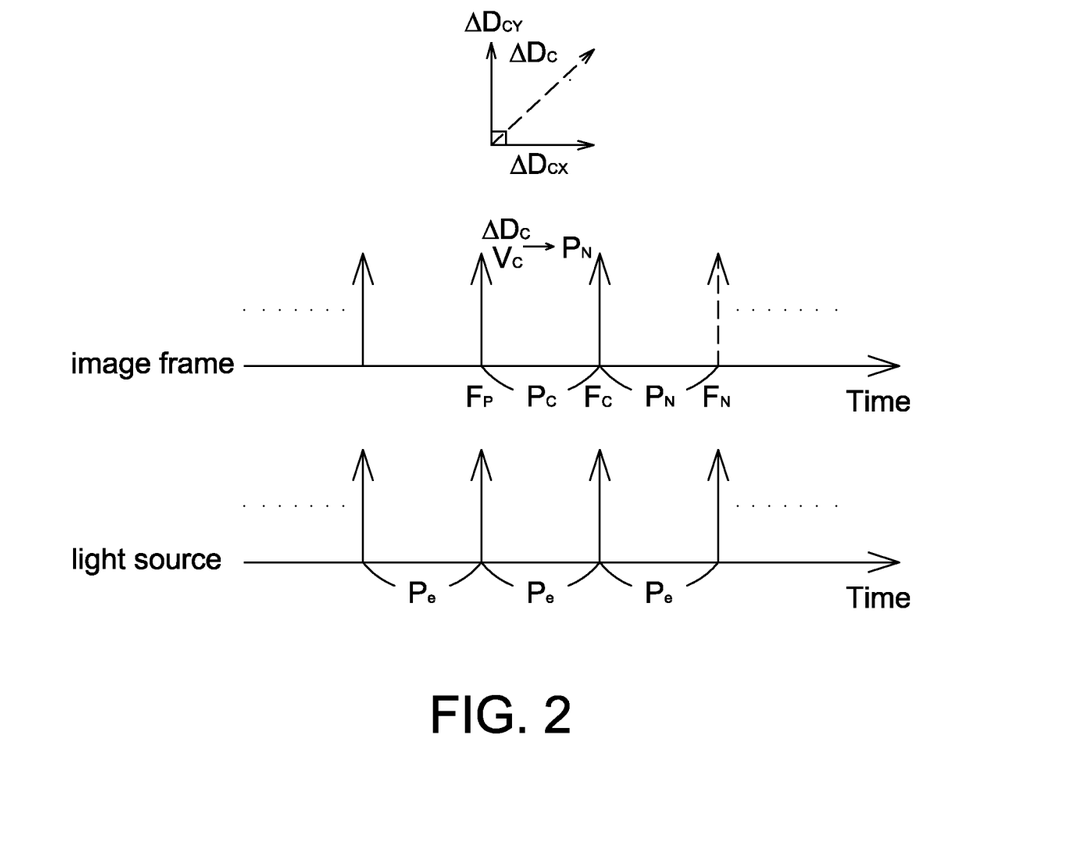
FIG. 2 is a schematic diagram of the image capturing and the light emission of a navigation device according to one embodiment of the present disclosure.

Referring to FIG. 2, it is a schematic diagram of the image capturing of an image sensor 13 and the light emission of a light source 11 of a navigation device 10 according to one embodiment of the present disclosure. In FIG. 2, one arrow in the second row refers to the light source 11 emitting light for a first predetermined time interval, and one arrow in the first row refers to the image sensor 13 receiving light for a second predetermined time interval. The first and second predetermined time intervals are identical to or different from each other.

The light source 11 is controlled by the processor 15 to illuminate light every an emission period Pe which is varied corresponding to the frame periods, e.g., $P_C$ and $P_N$, of the image sensor 13. The image sensor 13 is controlled by the processor 15 to capture image frames with an adjustable frame period (described later). For example, FIG. 2 shows that the image sensor 13 successively captures a previous image frame $F_P$, a current image frame $F_C$ and a next image frame $F_N$. The previous image frame $F_P$ and the current image frame $F_C$ are separated by a current frame period $P_C$. The current image frame $F_C$ and the next image frame $F_N$ are separated by a next frame period $P_N$. The emission periods Pe are different from each other if the corresponding frame periods e.g., $P_C$ and $P_N$, are different from each other. That is, the frame periods $P_C$ and $P_N$ are identical to or different from each other depending on operating conditions.

Figure 3:
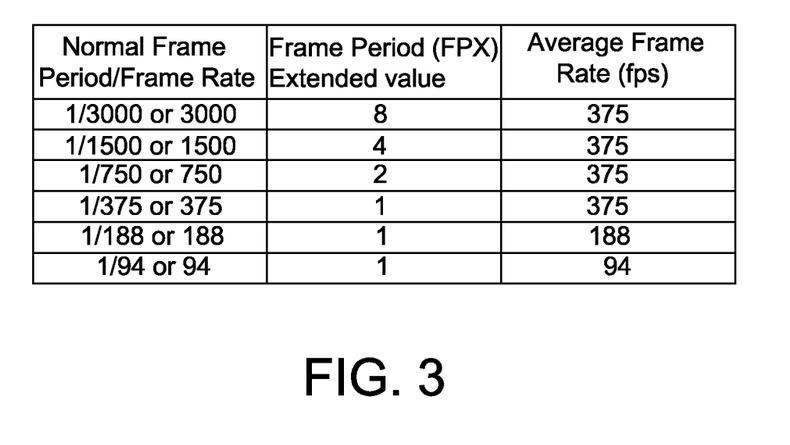
FIG. 3 is a relationship between normal frame rates and frame period extended values according to one embodiment of the present disclosure.

The memory 17 includes a volatile and/or a nonvolatile memory device for storing a predetermined relationship between a plurality of frame periods and a plurality of frame period extended values (FPX). Other parameters or algorithms for the operation are also stored in the memory 17. For example, referring to FIG. 3, it is a lookup table including a plurality of frame periods (or frame rates) each corresponding to one frame period extended value, wherein as the frame periods shown in FIG. 3 are between a pair of image frames captured in a normal mode (described later), they are shown as the normal frame period. In order to reduce an average frame rate by entering a low power mode (described later), at least one of the frame period extended values is larger than 1, e.g., the at least one frame period extended value larger than 1 corresponding to at least one shortest frame period, e.g., 1/3000, 1/1500 and 1/750 in FIG. 3, among the plurality of frame periods previously arranged. More specifically, the low power mode is entered only under high-frame-rate conditions.

In some embodiments, the navigation device 10 further has a register 19 used to store a next frame period extended value determined according to a previous image frame $F_P$ and a current image frame $F_C$, wherein the register 19 records an address to referred to the frame period extended value of the lookup table in the memory 17 or directly stores a digital value representing the current frame period extended value. The current frame period extended value stored in the register 19 is used to determine whether an inactive period is inserted after the current image frame $F_C$ and a length of the inserted inactive period.

Figure 4:
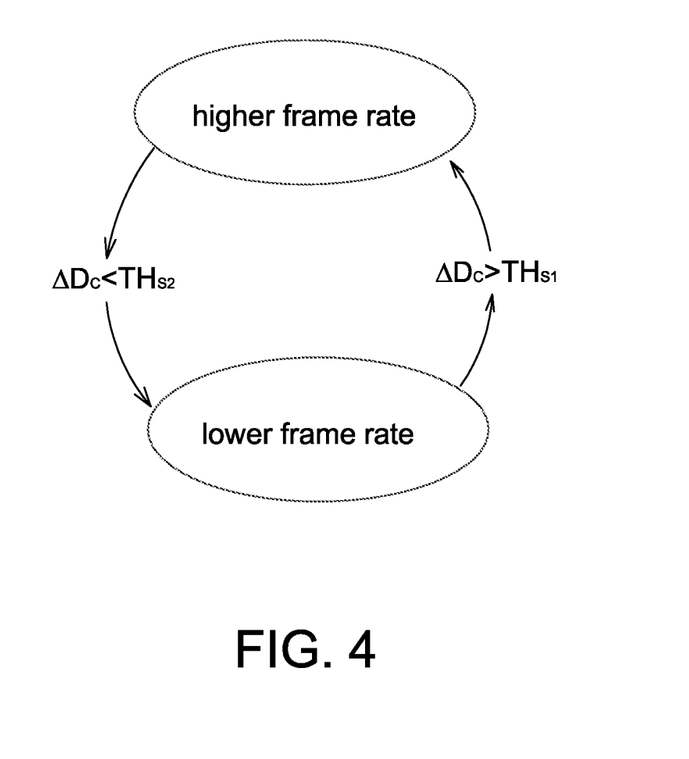
FIG. 4 is a schematic diagram of the frame rate alteration of a navigation device according to one embodiment of the present disclosure.

Referring to FIG. 4, it is a schematic diagram of adjusting the frame rate according to one embodiment of the present disclosure, wherein the high frame rate and the lower frame rate are, for example, two predetermined frame rates adjacent to each other as shown in FIG. 3. Referring to FIGS. 2-4 together, for example the processor 15 calculates a current displacement $\Delta Dc$ according to the previous image frame $F_P$ and the current image frame $F_C$ separated by a current frame period $P_C$ (e.g., one of frame rates in the first column of FIG. 3). A next frame rate is increased by one step if the current displacement $\Delta Dc$ is larger than a first speed threshold $TH_{S1}$ (e.g., 8 pixels, but not limited to) and decreased by one step if the current displacement $\Delta Dc$ is smaller than a second speed threshold $TH_{S2}$ (e.g., 7 pixels, but not limited to). For example, if a current frame rate is 750 fps and the calculated current displacement $\Delta Dc$ is larger than the first speed threshold $TH_{S1}$, a next frame rate is adjusted to 1500 fps; and if a current frame rate is 750 fps and the calculated current displacement $\Delta Dc$ is smaller than the second speed threshold $TH_{S2}$, a next frame rate is adjusted to 375 fps; otherwise the next frame rate is kept at 750 fps.

It is seen from FIG. 2 that the current displacement $\Delta Dc$ includes a first direction displacement $\Delta Dcx$ and a second direction displacement $\Delta Dcy$. In some embodiments, said the current displacement $\Delta Dc$ is larger than a first speed threshold $TH_{S1}$ is referred to that at least one of the first direction displacement $\Delta Dcx$ and the second direction displacement $\Delta Dcy$ is larger than the first speed threshold $TH_{S1}$ and said the current displacement $\Delta Dc$ is smaller than a second speed threshold $TH_{S2}$ is referred to that both of the first direction displacement $\Delta Dcx$ and the second direction displacement $\Delta Dcy$ are smaller than the second speed threshold $TH_{S2}$.

In another embodiment, the processor 15 calculates a current moving speed Vc by dividing the current displacement $\Delta Dc$ by a current frame period $P_C$ between the previous image frame $F_P$ and the current image frame $F_C$ at first. And then the processor 15 adjusts the frame rate (or frame period) step-by-step as shown in FIG. 4 by comparing the calculated current moving speed Vc with the first and second speed thresholds $TH_{S1}$ and $TH_{S2}$. In some embodiments, the first and second speed thresholds compared with the current moving speed Vc are different from that compared with the above current displacement $\Delta Dc$.

Similarly, the current moving speed Vc includes a first direction speed and a second direction speed, and the processor 15 respectively compares the first direction speed and the second direction speed with the first and second speed thresholds. The current moving speed Vc is larger than a first speed threshold is referred to at least one of the first direction speed and the second direction speed being larger than the first speed threshold. The current moving speed Vc is smaller than a second speed threshold is referred to both of the first direction speed and the second direction speed being smaller than the second speed threshold.

In some embodiments, the frame period or frame rate is directly read from a lookup table according to the calculated moving speed. One example of setting the frame rate based on the moving speed may be referred to U.S. patent application Ser. No. 14/934,169 assigned to the same assignee of the present application, and the full disclosure of which is incorporated herein by reference.

Preferably, the lookup table or the predetermined relationship is previously stored in the memory 17 before the shipment of the navigation device 10. It is seen from FIG. 3 that if the moving speed is faster, the frame period is shorter and the frame rate is faster. As the frame rate is obtainable from the frame period or vice versa, the memory 17 stores only one of the frame period and the frame rate.

The processor 15 is a central processing unit (CPU), a microcontroller (MCU), a digital signal processor (DSP), an application specific integrated circuit (ASIC) or the like. The processor 15 is electrically coupled to the memory 15 to access the lookup table, electrically coupled to the image sensor 13 to receive image frames F from the image sensor 13 for post-processing and electrically coupled to the accumulator 16 for outputting the calculated displacement thereto. The above operation performed by the processor 15 is implemented by software codes and/or hardware codes without particular limitations. In the present disclosure, the processor 15 adjusts the frame period (or frame rate) based on FIGS. 3 and 4 in a normal mode, while inserts an inactive period, referred to a low power mode herein (described later), to reduce the average frame rate when the frame rate is at a high level. By inserting the inactive period, the high frame rate is reduced and thus a lower average frame rate is obtainable.

The accumulator 16 accumulates the calculated displacement, which will be outputted or reported to an external electronic, e.g. a display, via the output interface 18, for ACC_N times. The ACC_N is equal to 2×FPX, wherein the FPX is a value stored in the register 19 and determined by a previous pair of image frames. The output interface 18 is a wired communication interface or a wireless communication interface.

Figure 5:
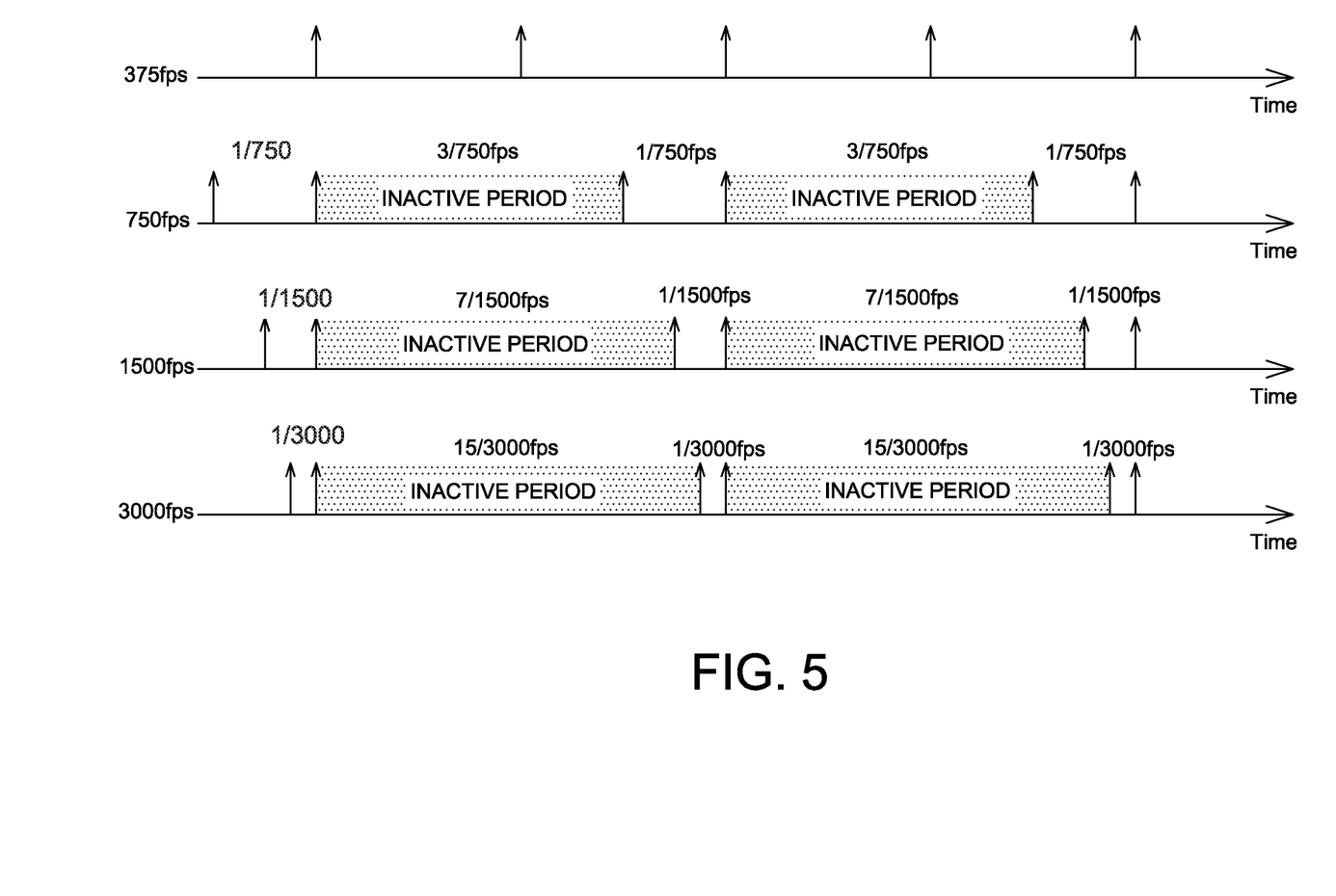
FIG. 5 is a schematic diagram of the normal mode and the low power mode of a navigation device according to one embodiment of the present disclosure.

Referring to FIG. 5, it is a schematic diagram of the image capturing of the image sensor 13 according to one embodiment of the present disclosure. For simplification, FIG. 5 does not show the light emission of the light source 11, and as mentioned above the light source 11 emits light when the image sensor 16 is capturing image frames as shown in FIG. 2. In this embodiment, it is assumed that the processor 15 does not insert any inactive period if the frame rate is selected to be lower than 750 frames per second (fps), and inactive periods are inserted, according to predetermined conditions described later, between pairs of image frames in order to reduce the average frame rate. In FIG. 5, it is assumed that the frame rate is not changed for simplification purposes. The length of an inactive period is determined according to a frame period extended value (FPX) and a next frame period determined according to two image frames prior to the inactive period, e.g., (2×FPX−1)×(the next frame period). For example, referring to FIG. 3, the FPX corresponding to 750 fps is 2, and thus the inactive period is three times (2×2−1) of a next frame period (1/750). The inactive periods at frame rates 1500 fps and 3000 fps are also shown in FIG. 5. It the case that the inactive periods are inserted between every pair of image frames, the average frame rates are identical at frame rates 375, 750, 1500 and 3000 fps.

Figure 6:
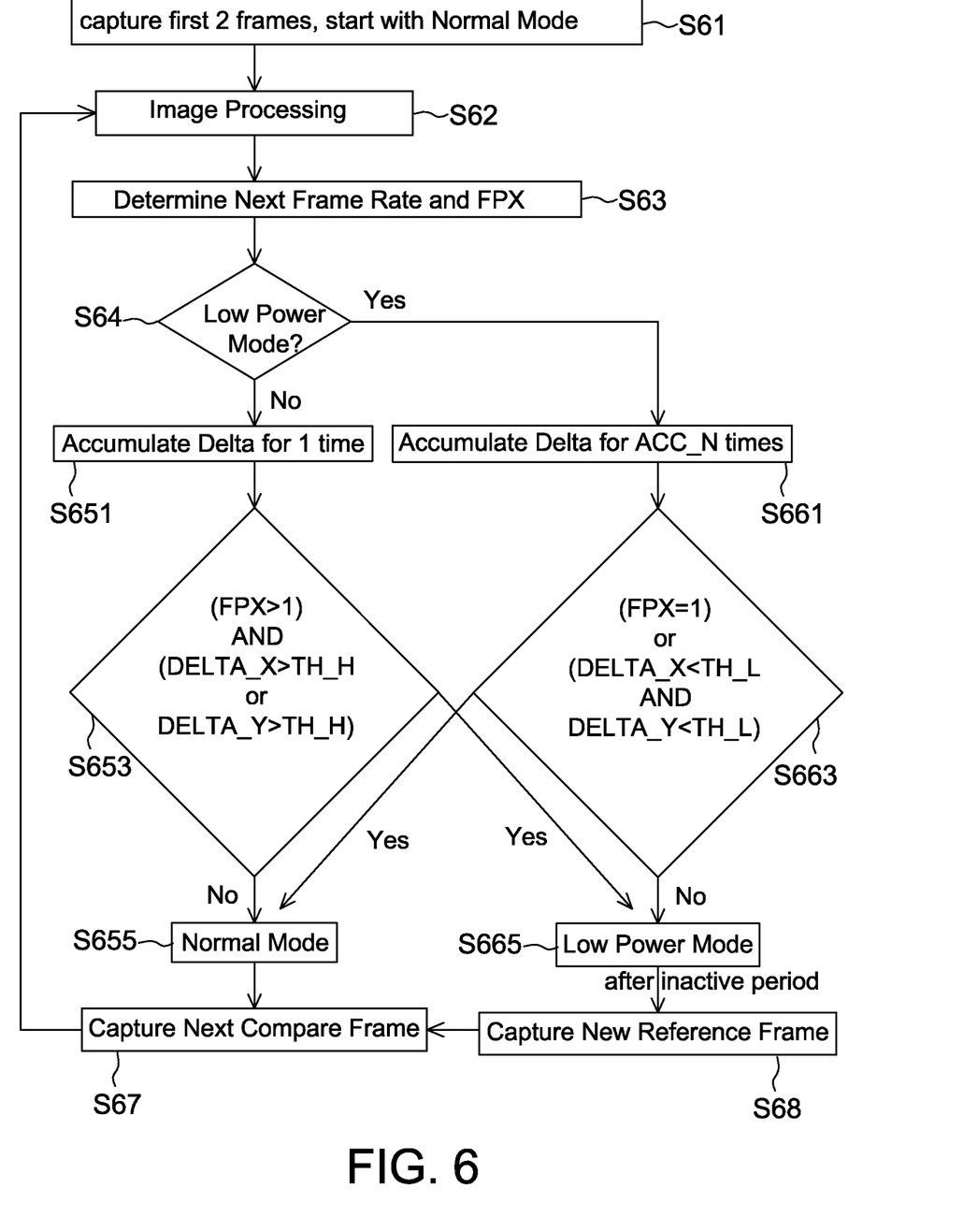
FIG. 6 is a flow chart of an operating method of a navigation device according to one embodiment of the present disclosure.
Figure 7:
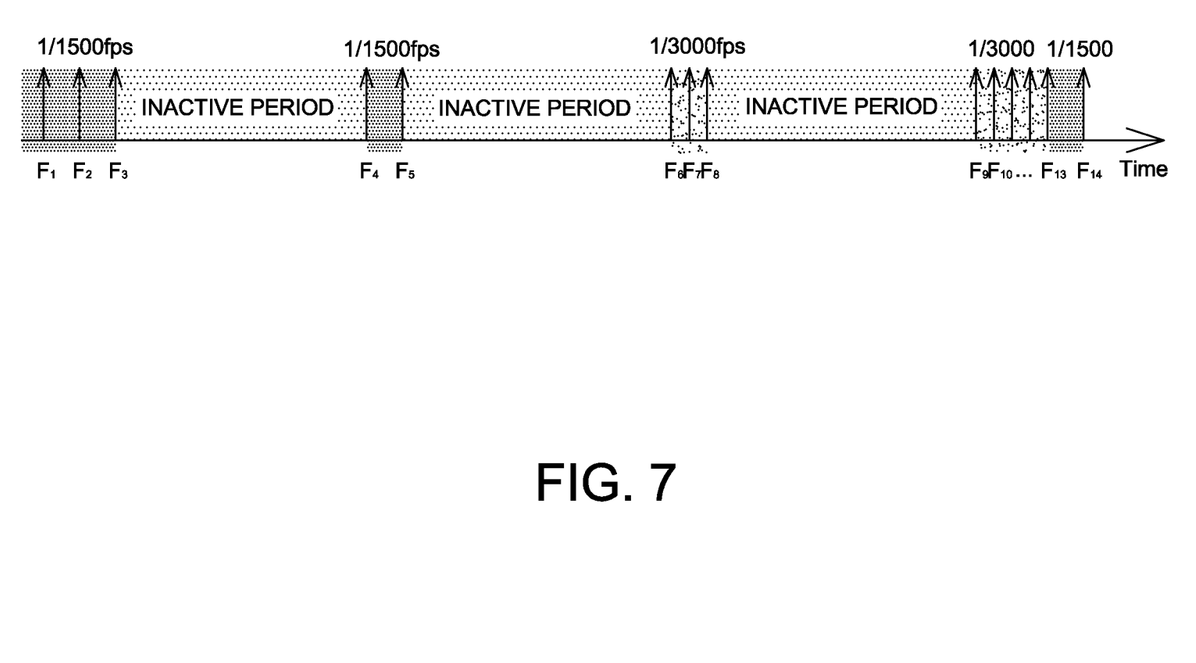
FIG. 7 is a schematic diagram of the operating method in FIG. 6 according to one embodiment of the present disclosure.

Referring to FIGS. 6-7, details of the operation of the navigation device 10 of one embodiment of the present disclosure are described hereinafter. FIG. 6 is a flow chart of an operating method of the navigation device 10 according to one embodiment of the present disclosure and FIG. 7 is a schematic diagram of the operating method in FIG. 6 according to an embodiment of the present disclosure.

Step S61: In the start, the navigation device 10 operates in a normal mode. In the present disclosure, the normal mode is referred to adjusting the frame rate based on the moving speed or displacement between two image frames and without inserting any inactive period. For example, a mode state is indicated by a flag register (not shown), e.g., flag bit 0 (or 1) for normal mode and flag bit 1 (0) for low power mode. As the process starts from the normal mode, the processor 15 controls the image sensor 13 to capture a first pair of image frames, e.g., $F_1$ and $F_2$ in FIG. 7. As mentioned above, the processor 15 also controls the light source 11 to illuminate light corresponding to the image capturing of the image sensor 13.

Step 62: After receiving the first pairs of image frames $F_1$ and $F_2$ from the image sensor 13, the processor 15 performs the post-processing on the first pairs of image frames $F_1$ and $F_2$. For example, the processor 15 compares the first pairs of image frames $F_1$ and $F_2$, e.g., calculating the correlation therebetween, to calculate a current displacement between the first pairs of image frames $F_1$ and $F_2$. The first pairs of image frames $F_1$ and $F_2$ outputted from the image sensor 13 are raw data or digitized image data depending on whether the image sensor 13 has an analog-to-digital converter therein. In addition, the processor 13 performs other operations, such as filtering on the first pairs of image frames $F_1$ and $F_2$ before calculating the current displacement to improve the image quality.

Step S63: After the current displacement is obtained, the processor 15 determines a next frame period and a corresponding frame period extended value (e.g., FPX1) according to the current displacement. For example, if it is assumed that the image sensor 13 captures the first pair of image frames $F_1$ and $F_2$ at a predetermined frame rate, e.g., 375 fps, at first. Then the processor 15 increases or decreases the predetermined frame rate to obtain the next frame period to capture a next image frame or a next pair of image frames based on FIG. 4. More specifically, the processor 15 increases the frame rate, e.g., from 375 fps to 750 fps, to capture the next image frame or next pair of image frames when the current displacement is larger than a first speed threshold, e.g., 8 pixels; and decreases the frame rate, e.g., from 375 fps to 188 fps, to capture the next image frame or next pair of image frames when the current displacement is smaller than a second speed threshold, e.g., 7 pixels; otherwise the frame rate is not adjusted.

As mentioned above, in some embodiments the processor 15 calculates a current moving speed by dividing the current displacement by a current frame period between the first pair image frames (e.g., a time interval between F1 and F2), and compares the calculated current moving speed with the upper and lower speed thresholds as FIG. 4. More specifically, the processor 15 increases the frame rate (or shorten the frame period) to capture the next image frame or next pair of image frames when the current moving speed is larger than the upper speed threshold; and decreases the frame rate (or extend the frame period) to capture the next image frame or next pair of image frames when the current moving speed is smaller than the lower speed threshold; otherwise the frame rate is not changed.

After the current displacement is obtained, the processor 15 is able to read the corresponding next frame period and frame period extended value (e.g., FPX1) from the memory 17. And the frame period extended value being read is stored in the register 19 for the following operation.

Step S64: The processor 15 knows the mode state according to the flag bit of the flag register, which is arranged in the processor 15 or the memory 17 without particular limitations. If the navigation device 10 operates in the normal mode, the flow moves to the Step S651, otherwise moves to the Step S661.

Step S651: Then, the accumulator 16 accumulates the current displacement (referred as DELTA in FIG. 6) for 1 time, and then the accumulated current displacement is outputted via the output interface 18 to an external device. In other words, in the normal mode, the calculated current displacement is directly outputted or reported to the external device without being changed.

Step S653: Next, the processor 15 determines whether to enter a low power mode or not. In this embodiment, it is assumed that the navigation device 10 does not enter the low power mode after the image frame $F_2$ is captured. That is, the processor 15 maintains in the normal mode when the FPX1 is equal to 1 or the current displacement is not larger than a high displacement threshold TH_X, e.g., 4 pixels, but not limited to. As mentioned above, in some embodiments the current displacement includes a first direction displacement, e.g., DELTA_X, and a second direction displacement, e.g., DELTA_Y. Said the current displacement is not larger than a high displacement threshold TH_H is referred to none of the first direction displacement DELTA_X and the second direction displacement DELTA_Y being larger than the high displacement threshold TH_H.

The selection of the high displacement threshold TH_H is a tradeoff as higher TH_H leads to a higher accuracy and lower TH_H allows the low power mode to be entered easier.

Step S655: After determining the mode state, the processor 15 updates the flag bit of the flag register, e.g., maintaining 0 for the normal mode herein.

Step S67: Next, the processor 15 controls the image sensor 15 to capture a next image frame, e.g., $F_3$, after the first pair of image frames $F_1$ and $F_2$ by the next frame period obtained in the Step S63. That is, the next frame period in this step is a time interval between the image frames $F_2$ and $F_3$.

Then the process returns to the Step S62 to post-process the image frames $F_2$ and $F_3$, i.e., a new pair of first image frames, and then the processor 15 determines a new next frame period and a new frame period extended value in the Step 63. Details of the Steps S62-S63 for processing the image frames $F_2$ and $F_3$ are similar to those for processing the image frames $F_1$ and $F_2$, and thus are not repeated herein.

In the Step S64, the processor 15 reads the updated flag bit in flag register and controls the flow to move to the Step S651 again, and similar to the descriptions above the accumulator 16 accumulates the displacement, which is calculated according to image frames $F_2$ and $F_3$, and then the output interface 18 outputs the accumulated displacement to the external device. Till now, the navigation device 10 reports a calculated displacement per frame period.

In the embodiment shown in FIG. 7, it is assumed that the navigation device 10 enters the low power mode after capturing the image frame $F_3$. That is, in the Step S653, the new frame period extended value (new FPX1) is larger than 1 and the current displacement between image frames $F_2$ and $F_3$ is larger than the high displacement threshold TH_H. Therefore, the flow moves to the Step S665. As mentioned above, in some embodiments the current displacement includes a first direction displacement, e.g., DELTA_X, and a second direction displacement, e.g., DELTA_Y. Said the current displacement is larger than a high displacement threshold TH_H is referred to at least one of the first direction displacement DELTA_X and the second direction displacement DELTA_Y being larger than the high displacement threshold TH_H.

Step S665: The processor 15 changes the flag bit in the flag resistor, e.g., from 0 to 1 or from 1 to 0. After the low power mode is entered, the processor 15 deactivates the image sensor 15 within an inactive period (e.g., a time interval between $F_3$ and $F_4$ in FIG. 7), which is equal to (2×FPX1−1)×(the next frame period). In this case, the FPX1 and the next frame period are obtained according to the calculated displacement between the image frames $F_2$ and $F_3$ and read from the memory 17 in Step S63 of the same iteration. During the inactive period, the image sensor 13 is deactivated not to capture any image frame, and the processor 15 does not calculate displacement to reduce the power consumption.

Steps S68-S67: After the inactive period (e.g., a time interval between $F_3$ and $F_4$ in FIG. 7), the processor 15 controls the image sensor 13 to capture a second pair of image frames, e.g., $F_4$ and $F_5$, separated by the next frame period (obtained according to image frames $F_2$ and $F_3$) after the inactive period. In this embodiment, the image frame $F_4$ is used as a new reference frame, and the image frame $F_5$ is used as a next capture frame to be compared with the image frame F4.

Then, the process returns to the Step S62 and the processor 15 calculates an accumulated displacement according to the second pair of image frames $F_4$ and $F_5$. In Step S63, the processor 15 determines a second next frame period and a corresponding frame period extended value (FPX2) according to the accumulated displacement, e.g., reading the second next frame period and FPX2 from the memory 17 according to the accumulated displacement. Meanwhile, the register 19 still stores the FPX1 obtained in the previous iteration.

In Step S64, the process moves to S661 as the updated flag bit in the flag register indicates a low power mode.

Step S661: The accumulator 16 accumulates the accumulated displacement for ACC_N (e.g., 2×FPX1) times to compensate the displacement not outputted in the inactive period, i.e. a time interval between $F_3$ and $F_4$. Then, the output interface 18 outputs an extrapolation displacement as 2×FPX1×(the accumulated displacement). Then, the flow moves to the Step S663. The processor 15 replaces the FPX1 (i.e., current FPX) stored in the register 19 by the FPX2 (next FPX) after the extrapolation displacement is outputted, e.g., after the Step S661.

Step S663: Then, the processor 15 determines whether to maintain the low power mode or not. For example, when the FPX2 is equal to 1 or the accumulated displacement is smaller than a low displacement threshold, which is smaller than the high displacement threshold, e.g., 3 pixels, the low power mode is left, and the flow moves to the Step S655. In Step S655, the processor 15 updates the flag register to indicate the normal mode. Then, the processor 15 captures another image frame after the second next frame period when the FPX2 is equal to 1 or the accumulated displacement is smaller than the low displacement threshold.

On the other hand, when the FPX2 is larger than 1 and the accumulated displacement is not smaller than the low displacement threshold, the low power mode is maintained and the flow moves to the Step S665. Then, the processor 15 captures a third pair of image frames, e.g., $F_6$ and $F_7$, after another inactive period, e.g., a time interval between $F_5$ and $F_6$, when the FPX2 is larger than 1 and the accumulated displacement is larger than or equal to the low displacement threshold, wherein the another inactive period is equal to (2×FPX2−1)×(the second next frame period). Then, the flow moves to the Step S62 again to start another iteration.

More specifically, in the present disclosure the processor 15 determines whether to insert an inactive period according to two successive image frames. For example, if a pair of image frames $F_6$ and $F_7$ in FIG. 7 are considered, the processor 15 calculates a current displacement according to the pair of image frames $F_6$ and $F_7$, and the accumulator 16 accumulates the current displacement for 2×FPXc times, wherein the FPXc is determined in a previous iteration and stored in the register 19. The processor 15 reads the stored FPXc from the register 19, and then the output interface 118 outputs an extrapolation displacement as 2×FPXc×(the current displacement). As mentioned above, the navigation device 10 stops outputting any displacement within an inactive period prior to the pair of image frames $F_6$ and $F_7$, wherein the inactive period is equal to (2×FPXc−1)×(a current frame period), and the current frame period is a time interval between the pair of image frames $F_6$ and $F_7$. The extrapolation displacement is used to compensate the displacement during the inactive period and represent the current displacement.

The processor 15 further determines a next frame period and a next frame period extended value (FPXn) according to the calculated current displacement. If an inactive period is not inserted, i.e. leaving the low power mode, the processor 15 controls the image sensor 13 to capture a next image frame, e.g., $F_8$, after the next frame period when the FPXn is equal to 1 or the current displacement is smaller than a low displacement threshold, e.g., from the Step S663 to Step S655 and then to S67.

On the other hand, if an inactive period is inserted, i.e. keeping the low power mode, the processor 15 is further configured to control the image sensor 13 to capture another pair of image frames after an inactive period when the FPXn is larger than 1 and the current displacement is not smaller than the low displacement threshold, wherein the inactive period is equal to (2×FPXn−1)×(the next frame period). In this case, if the pair of image frames are considered as $F_4$ and $F_5$ in FIG. 7, said another pair of image frames are considered as $F_6$ and $F_7$ in FIG. 7. The flow moves from the Step S663 to Steps S665, S68 and then to S67.

The operating method mentioned above is also applicable to a touchpad or a touch screen without being limited to optical displacement detection devices. In this case, the device employing the operating method of the present disclosure does not include a light source for illuminating a surface.

In addition, the sequence of some steps in FIG. 6 is changeable. For example, it is possible to arrange the Step S63 after the Step S64 or after the Steps S651 and S661 since the obtained next frame rate and FPX are not used in the Steps S64, S651 and S661.

In the present disclosure, when the process returns to the Step S62, a new iteration is entered. In the present disclosure, the accumulated displacement is referred to a calculated displacement to be accumulated for ACC_N times by the accumulator 16.

It should be mentioned that values and the sequential of mode change mentioned in the above embodiments are only intended to illustrate but not to limit the present disclosure.

As mentioned above, although the power consumption of a conventional optical mouse is reduced by employing an adaptable frame rate, the power consumption is still high if the optical mouse is operated continuously at high frame rates. Therefore, the present disclosure further provides a navigation device (FIG. 1) and an operating method thereof (FIGS. 6-7) that insert an inactive period after a pair of image frames to reduce an average frame rate. Preferably, said inactive period is only added at high frame rates and other lower frame rates are not inserted with any inactive period. During the inactive period, the image sensor does not capture any image frame and the processor does not calculate displacement or moving speed to accordingly reduce the power consumption for the calculation algorithm.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A navigation device, comprising:
a memory configured to store a plurality of frame periods and a plurality of frame period extended values, wherein each of the frame period extended values corresponds to one of the frame periods, at least one of the frame period extended values is equal to 1 and at least another one of the frame period extended values is larger than 1 and equal to 2n, where n is a positive integer;
an image sensor configured to capture a first pair of image frames;
a processor electrically coupled to the memory and the image sensor, and configured to
calculate a current displacement according to the first pair of image frames,
determine a next frame period and a corresponding frame period extended value (FPX1) according to the calculated current displacement, and
insert an inactive period after the first pair of image frames, during which no image frame is captured by the image sensor, when the FPX1 is larger than 1 and the current displacement is larger than a high displacement threshold, wherein the inactive period is equal to (2×FPX1−1)×(the next frame period),
wherein a time interval from a first image frame of the first pair of image frames to an end of the inactive period is not changed even though a different frame period extended value, which is larger than 1 and equal to 2n, is determined according to the calculated current displacement.

2. The navigation device as claimed in claim 1, wherein the processor is further configured to
control the image sensor to capture a second pair of image frames separated by the next frame period after the inactive period,
accumulate an accumulated displacement, which is calculated according to the second pair of image frames, for 2×FPX1 times, and
output the accumulated displacement accumulated for the 2×FPX1 times as an extrapolation displacement of the inactive period.

3. The navigation device as claimed in claim 2, wherein the processor is further configured to
determine a second next frame period and a corresponding frame period extended value (FPX2) according to the accumulated displacement, and
not insert another inactive period after the second pair of image frames when the FPX2 is equal to 1 or the accumulated displacement is smaller than a low displacement threshold, which is smaller than the high displacement threshold.

4. The navigation device as claimed in claim 3, wherein the processor is further configured to
insert the another inactive period after the second pair of image frames when the FPX2 is larger than 1 and the accumulated displacement is not smaller than the low displacement threshold.

5. The navigation device as claimed in claim 1, wherein the current displacement includes a first direction displacement and a second direction displacement, and
said the current displacement is larger than a high displacement threshold is referred to at least one of the first direction displacement and the second direction displacement being larger than the high displacement threshold.

6. The navigation device as claimed in claim 1, wherein the processor is further configured to
calculate a current moving speed by dividing the current displacement by a current frame period between the first pair image frames,
increase a frame rate to capture a second pair of image frames separated by the next frame period after the inactive period when the current moving speed is larger than a first speed threshold, and
decrease the frame rate to capture the second pair of image frames separated by the next frame period after the inactive period when the current moving speed is smaller than a second speed threshold, which is smaller than the first speed threshold.

7. The navigation device as claimed in claim 6, wherein the current moving speed includes a first direction speed and a second direction speed,
said the current moving speed is larger than a first speed threshold is referred to at least one of the first direction speed and the second direction speed being larger than the first speed threshold; and
said the current moving speed is smaller than a second speed threshold is referred to both of the first direction speed and the second direction speed being smaller than the second speed threshold.

8. The navigation device as claimed in claim 1, wherein the processor is further configured to
not insert the inactive period after the first pair of image frames when the FPX1 is equal to 1 or the current displacement is not larger than the high displacement threshold, and
control the image sensor to capture a next image frame after the next frame period from the first pair of image frames.

9. The navigation device as claimed in claim 1, wherein the at least another one frame period extended value larger than 1 and equal to 2n corresponds to at least one shortest frame period among the plurality of frame periods.

10. A navigation device, comprising:
an image sensor configured to capture a pair of image frames;
a register configured to store a current frame period extended value (FPXc); and
a processor electrically coupled to the register and the image sensor, and configured to
calculate a current displacement according to the pair of image frames,
read the FPXc from the register,
select a next frame period and a next frame period extended value (FPXn) according to the calculated current displacement, wherein the next frame period is selected from a plurality of predetermined frame periods, the FPXn is selected from a plurality of predetermined frame period extended values, each of the predetermined frame period extended values corresponds to one of the predetermined frame periods, at least one of the predetermined frame period extended values is equal to 1, and at least another one of the predetermined frame period extended values is larger than 1 and equal to 2n, where n is a positive integer,
capture a next image frame after the next frame period when the FPXn is equal to 1 or the current displacement is smaller than a low displacement threshold, and
control the image sensor to capture another pair of image frames after an inactive period, during which no image frame is captured by the image sensor, when the FPXn is larger than 1 and the current displacement is not smaller than the low displacement threshold, wherein the inactive period is equal to $(2 \times FPXn-1) \times$(the next frame period),
wherein a time interval from a first image frame of the pair of image frames to an end of the inactive period is not changed even though a different FPXn, which is larger than 1, is selected.

11. The navigation device as claimed in claim 10, wherein the processor is further configured to
accumulate the calculated current displacement for $2 \times FPXc$ times, and
output the accumulated current displacement accumulated for the $2 \times FPXc$ times as an extrapolation displacement of the inactive period.

12. The navigation device as claimed in claim 11, wherein the processor is further configured to replace the FPXc stored in the register by the FPXn after the extrapolation displacement is outputted.

13. The navigation device as claimed in claim 10, wherein the at least another one frame period extended value larger than 1 and equal to 2n corresponds to at least one shortest frame period among the plurality of predetermined frame periods.

14. The navigation device as claimed in claim 10, wherein the navigation device stops outputting any displacement within an inactive period prior to the pair of image frames being captured, wherein the inactive period is equal to $(2 \times FPXc-1) \times$(a current frame period), wherein the current frame period is a time interval between the pair of image frames.

15. An operating method of a navigation device, the navigation device comprising an image sensor and a processor electrically coupled to each other, the operating method comprising:
capturing, by the image sensor, a first pair of image frames;
calculating, by the processor, a current displacement according to the first pair of image frames;
selecting, by the processor, a next frame period and a corresponding frame period extended value (FPX1) according to the calculated current displacement, wherein the next frame period is selected from a plurality of predetermined frame periods, the FPX1 is selected from a plurality of predetermined frame period extended values, each of the predetermined frame period extended values corresponds to one of the predetermined frame periods, at least one of the predetermined frame period extended values is equal to 1, and at least another one of the predetermined frame period extended values is larger than 1 and equal to 2n, where n is a positive integer;
capturing, by the image sensor, a next image frame after the next frame period when the FPX1 is equal to 1 or the current displacement is not larger than a high displacement threshold; and
capturing, by the image sensor, a second pair of image frames after an inactive period, during which no image frame is captured by the image sensor, when the FPX1 is larger than 1 and the current displacement is larger than the high displacement threshold, wherein the inactive period is equal to $(2 \times FPX1-1) \times$(the next frame period);
wherein a time interval from a first image frame of the first pair of image frames to an end of the inactive period is not changed even though a different FPX1, which is larger than 1, is selected.

16. The operating method as claimed in claim 15, further comprising:
accumulating, by the processor, an accumulated displacement, which is calculated according to the second pair of image frames, for $2 \times FPX1$ times, and
outputting the accumulated displacement accumulated for the $2 \times FPX1$ times as an extrapolation displacement of the inactive period.

17. The operating method as claimed in claim 15, further comprising:
selecting, by the processor, a second next frame period and a corresponding frame period extended value (FPX2) respectively from the plurality of predetermined frame periods and the plurality of predetermined frame period extended values according to the calculated accumulated displacement, and
capturing, by the image sensor, another image frame after the second next frame period when the FPX2 is equal to 1 or the accumulated displacement is smaller than a low displacement threshold, which is smaller than the high displacement threshold.

18. The operating method as claimed in claim 17, further comprising:
capturing a third pair of image frames after another inactive period when the FPX2 is larger than 1 and the accumulated displacement is larger than the low displacement threshold, wherein the another inactive period is equal to $(2 \times FPX2-1) \times$(the second next frame period).

19. The operating method as claimed in claim 15, further comprising:
increasing a frame rate to capture the second pair of image frames when the current displacement is larger than a first speed threshold, and decreasing the frame rate to capture the second pair of image frames when the current displacement is smaller than a second speed threshold, which is smaller than the first speed threshold.

20. The operating method as claimed in claim 15, wherein the at least another one frame period extended value larger than 1 and equal to 2n corresponds to at least one shortest frame period among the plurality of predetermined frame periods.

\* \* \* \* \*